United States Patent Office 2,914,549
Patented Nov. 24, 1959

2,914,549
PRODUCTION OF ALKYL HALOSILANES BY REACTING SILICA WITH ALKYL ALUMINUM HALIDES

Robert Craig Anderson, Largs, Scotland, assignor to Imperial Chemical Industries Limited, London, England, a corporation of Great Britain No Drawing. Application September 30, 1957
Serial No. 686,819
Claims priority, application Great Britain
September 28, 1956
21 Claims. (Cl. 260—448.2)

This invention relates to a new and improved method for the production of organo-silicon compounds and more particularly for the production of alkyl silanes and alkyl halo-silanes.

Organo-silicon compounds such as the alkyl silanes and alkyl halo-silanes can be prepared by various methods such as e.g. direct reaction of silicon with an alkyl halide or reaction of silicon halides with Grignard reagents. It has also been proposed to prepare such compounds by alkylating silicon tetrafluoride with aluminium alkyls. Another method which has been proposed is to react a silane with an olefine while a further method proposed for preparing these compounds is to react silica with a dibutyl ether solution of ethyl magnesium bromide.

According to the present invention a new and improved process for the production of alkyl silanes or alkyl halo-silanes comprises reacting together silica, and an alkyl aluminium halide of the general formula $R_aR_b'AlX_{3-a-b}$ where R and R' are alkyl groups, X is a halogen, $a$ is 1 or 2, $b$ is 0 or 1 and $a+b=1$ or 2.

Suitable silicas for use in the process of our invention, include for example, silica gels, fume silicas such as the "Aerosils" and diatomaceous earths such as kieselguhr and industrial silica-containing residues, for example those obtained by extraction of metal oxides from silicates. Materials of high specific surface area are preferred as they are normally more reactive. It is also preferred to use materials in which the silica is in a non-crystalline form. It is also normally preferred to dry the silica by heating prior to use as this gives an appreciably increased yield.

The alkyl aluminium halides, which may be used are preferably those in which R and R' are methyl or ethyl groups. Other alkyl groups such as propyl or butyl may also be used. In such cases, however, the reaction is accompanied by the production of olefinic by-products. The halogen group X may be chlorine, bromine, fluorine or iodine. It is, however, preferred to use chlorides or bromides. Suitable alkyl aluminium halides include methyl aluminium dichloride, methyl aluminium sesquichloride, dimethyl aluminium chloride, dimethyl aluminium iodide, ethyl aluminium sesquichloride, ethyl aluminium sesquibromide and ethyl aluminium sesquiiodide. In addition to the alkyl aluminium halide the reaction mixture may also contain one or more aluminium trialkyls and/or one or more aluminium halides. The alkyl aluminium halide may, if desired, be formed in situ by the reaction of an alkyl halide and aluminium and in this case it is sometimes preferable to use a catalyst to initiate or accelerate the reaction. Suitable catalysts include for example copper and copper alloys, aluminium halides such as aluminium chloride, alkyl aluminium halides, compound aluminium halides and the like.

The relative proportions of the silica and the alkyl aluminium halide used in the process of our invention may vary within wide limits. For most purposes proportions giving a molar ratio of Si:Al of from 1:2 to 4:1 are eminently satisfactory. It is, however, preferred to operate within the range 1:1 to 2:1.

The reaction is normally preferably carried out by heating the reactants together under pressure which may be the autogenous pressure generated at the temperature of reaction. The reaction may however, also be carried out under atmospheric or subatmospheric pressures. Normally the reaction proceeds more quickly at higher pressures and more slowly at lower pressures and in fact in some cases the rate of reaction of specific reactants is too slow at low pressures to be suitable for commercial operation. In certain cases, however, e.g. using alkyl aluminium halides liable to decompose at high temperatures such as certain of the bromides low pressure operation may be advantageous. The heating may be within the temperature range 125–500° C. but is preferably within the range 200–330° C. In many cases it is convenient to carry out the reaction batchwise. It is, however, also possible to operate in a continuous manner.

Normally it is preferred to carry out the reaction in the absence of any solvent. If desired, however, a solvent can be included in the reaction mixture. Suitable solvents include high boiling hydrocarbons.

The time required for reaction, will, of course, depend on the reactivity of the silica used and on the temperature of the reaction. Normally times of the order of 2 to 14 hours are sufficient.

Our invention is further illustrated by the following examples in which all parts and percentages are by weight.

Example 1

33.0 parts methyl aluminium sesquichloride were reacted with 12.0 parts dried kieselguhr of particle size 5–7 microns by heating at 300° C. for 14 hours in a glass-lined pressure vessel which had been flushed with nitrogen immediately prior to use. The reaction mixture was thereafter cooled to 0° C., the pressure released and the products boiling below 100° C. distilled giving 4.0 parts of a condensate consisting of tetramethylsilane.

Example 2

41.0 parts ethyl aluminium sesquichloride were reacted with 9.5 parts dried chromatographic silica gel by heating at a temperature of 300° C. for 14 hours in a glass-lined pressure vessel which had been flushed with nitrogen immediately prior to use. The mixture was thereafter cooled to 0° C. the pressure released and the products volatile below 200° C. distilled. The distillate was filtered to free it from a small quantity of precipitated aluminium chloride giving 10.0 parts of a light yellow filtrate. Analysis showed this filtrate to contain 44% triethylchlorsilane, a small proportion of diethyldichlorsilane, 21% of diethylmethyl chlorsilane and about 12% of a mixture of ethyldimethylchlorsilane, ethylmethyldichlorsilane and other silanes.

Example 3

57.5 parts ethyl aluminium sesquibromide were reacted at 310° C. for 14 hours with 6.0 parts dried chromatographic silica gel. The reaction mixture was treated with water and thereafter extracted with ether. On removal of the ether there remained 6.5 parts of a light yellow oil containing 40% tetraethylsilane and 15% triethyl silanol, the remainder being of higher boiling ethylsiloxanes.

Example 4

33.0 parts methyl aluminium sesquichloride were reacted at 310° C. for 14 hours with 9.5 parts pure precipitated silica of particle size about 2 microns, in the manner described in Example 1. 6.2 parts of a reaction product containing 30% tetramethylsilane and 70% trimethylchlorsilane with traces of dimethyldichlorsilane and methyltrichlorsilane were obtained.

Example 5

16 parts of dried chromatographic silica gel, 9 parts of granular aluminium powder and 0.9 part of "Durolustre" copper bronze powder were charged into a stirred reaction vessel. Methyl chloride was then passed through the reaction mixture at a rate of 6.8 parts per hour for 6 hours while the temperature was maintained at 320° C. The reaction product consisted of a methyl chloride solution containing 7.8 parts of organosilicon compounds, consisting of 14% trimethylchlorsilane, 48% dimethyldichlorsilane, 31.3% methyltrichlorsilane and traces of tetramethylsilane and methyldichlorsilane.

Example 6

The procedure in this case was the same as that in Example 5 except that the reaction temperature was 300° C. The product obtained consisted of a methyl chloride solution containing 5.15 parts of organosilicon compounds. The mixture of organosilicon compounds consisted of 32.6% trimethylchlorsilane, 46% dimethyldichlorsilane, 9.8% methyltrichlorsilane with traces of tetramethylsilane and methyldichlorsilane.

Example 7

A reaction vessel was charged with 16 parts of the silica gel used in Example 5 and 9 parts of aluminium powder. These were heated to 250° C. and methyl chloride passed through at a rate of 2.3 parts per hour for 16.5 hours. The reaction product consisted of a methyl chloride solution containing 8.35 parts of organosilicon compounds, consisting of 81% tetramethylsilane, 18% trimethylchlorsilane and traces of trimethylsilane and dimethyldichlorsilane.

Example 8

The procedure was identical to that of Example 7 except that the reaction temperature was 200° C. and that methyl chloride was passed over the solid reactants at a rate of 1.6 parts per hour for 49 hours. The reaction product consisted of a methyl chloride solution containing 5.7 parts of tetramethylsilane.

Example 9

A reaction vessel was charged with 16 parts of a dried residue obtained by extraction of alumina from an aluminosilicate and which contained 78.8% silicon, and 9 parts of ground scrap aluminium containing 91% aluminium and 1.4% magnesium. This mixture was heated to 270° C. and nitrogen passed through it for one hour. Methyl chloride was thereafter passed through the mixture at a rate of 2.3 parts per hour for 17.5 hours and 0.5 part of methyl aluminium sesquichloride were introduced with the methyl chloride 25 minutes after the start of flow. The reaction temperature was allowed to rise to 285° C. during the course of the reaction and a product was obtained consisting of a methyl chloride solution containing 7.9 parts of organosilicon compounds consisting of 58% tetramethylsilane, 29% trimethylchlorsilane, 2% dimethyldichlorsilane, and traces of methyldichlorsilane and trichlorsilane.

Example 10

A stirred reaction vessel was charged with 16 parts of the dried residue used in Example 9 and 9 parts scrap aluminium. The mass was heated to 270° C. and methyl chloride passed therethrough at a rate of 1.3 parts per hour for 19 hours. The reaction product consisted of a methyl chloride solution containing 7.4 parts of tetramethylsilane with traces of trimethylchlorsilane.

Example 11

A reaction vessel was charged with 16 parts of dried chromatographic silica gel and 9 parts of granular aluminium powder and the contents heated to 270–5° C. Ethyl chloride vapour was passed through the mixture at a rate of 4 parts per hour for 14 hours. The reaction product obtained contained 4.6 parts of organosilicon compounds consisting of 50% triethylchlorsilane, 42% diethyldichlorsilane, 5% diethylmethylchlorsilane and small amounts of about 1% each of ethylmethyldichlorsilane and ethyltrichlorsilane with trace amounts of triethylmethylsilane, triethylsilane and ethyldimethylchlorsilane.

Example 12

10 parts of the dried residue used in Example 9 were reacted with 10.5 parts of ethyl aluminium sesquichloride at a temperature of 310° C. for 15 hours. 5.1 parts of product containing 35% triethylchlorsilane, 47% diethyldichlorsilane, 3% ethylmethyldichlorsilane and 11.6% diethylmethylchlorsilane were obtained.

Example 13

10 parts of the dried residue used in Example 9 were reacted with 22 parts of ethyl aluminium sesquichloride at a temperature of 310° C. for 15 hours. 6.6 parts of product consisting of 66% triethylchlorsilane, 54% diethyldichlorsilane, 26% diethylmethylchlorsilane and 4% ethyldimethylchlorsilane were obtained.

Example 14

10 parts of the dried residue used in Example 9 were reacted with 10.6 parts of ethyl aluminium sesquichloride at a temperature of 325° C. for one hour. 4.5 parts of product consisting of 56% triethylchlorsilane, 23.9% diethyldichlorsilane, 15.7% diethylmethylchlorsilane and 2.7% ethylmethyldichlorsilane were obtained.

Example 15

10 parts of the dried residue used in Example 9 were reacted with 10.6 parts of ethyl aluminium sesquichloride at a temperature of 325° C. for 2 hours. 5.3 parts of product consisting of 34.6% trimethylchlorsilane, 46.2% diethyldichlorsilane, 11.3% diethylmethylchlorsilane and 7.79% ethylmethyldichlorsilane were obtained.

Example 16

10 parts of the dried residue used in Example 9 were reacted with 10.6 parts of ethyl aluminum sesquichloride at 325° C. for 5 hours. 5.3 parts of product consisting of 34.7% triethylchlorsilane, 49.2% diethyldichlorsilane, 9.2% diethylmethylchlorsilane and 5.3% ethylmethyldichlorsilane were obtained.

Example 17

10 parts of the dried residue used in Example 9 were reacted with 11 parts of ethyl aluminum sesquichloride at 295° C. for 5 hours. 5.4% of product consisting of 36% triethylchlorsilane, 48% diethyldichlorsilane, 10% diethylmethylchlorsilane, and 6% ethylmethyldichlorsilane were obtained.

Example 18

20 parts of dried chromatographic silica gel were heated under reflux with 257 parts of ethyl aluminium sesquibromide for 1.5 hours. The liquid refluxing at 148° C. was collected intermittently for 2.25 hours to give 33 parts of tetraethylsilane containing small amounts of triethylmethylsilane and triethylsilane.

Example 19

10 parts of dried chromatographic silica gel were heated under reflux with 125 parts of ethyl aluminium sesquichloride. After 2 hours the temperature of the refluxing liquid was 148° C. This liquid was collected intermittently over 2 hours and gave 10.5 parts of product containing 95% of tetraethylsilane with small amounts of triethylchlorsilane and triethylmethylsilane.

Example 20

A mixture the same as that of Example 18 was heated under reflux for 14 hours and the product thereafter collected intermittently. 12 parts of product boiling at 125–145° C. and containing 79% tetraethylsilane, 11.5% triethylmethylsilane, and 9.5% triethylsilane were obtained.

Example 21

12 parts of dried kieselguhr suspended in 163 parts of ethyl aluminium sesquibromide were heated under reflux for a period of 3.5 hours by which time the temperature of the refluxing liquid had fallen to 150° C. 12.1 parts of product of boiling point 150–153° C. were collected over a period of 8 hours and were found to contain 93% tetraethylsilane, 6% triethylmethylsilane and a small amount of triethylsilane.

Example 22

12 parts of the dried residue used in Example 9 suspended in 175 parts of ethyl aluminium sesquibromide were heated under reflux for 1.5 hours by which time the temperature of the refluxing liquid had fallen to 148° C. 12.4 parts of product were collected intermittently over a further 4 hours and consisted almost entirely of tetraethylsilane with a little triethylmethylsilane and triethylsilane.

Example 23

10 parts of dried chromatographic silica gel and 141 parts of ethyl aluminium sesquibromide were heated under reflux under a pressure of 540 mm. of mercury. After 45 minutes the temperature of the refluxing mixture had fallen to 148° C. and remained steady. 14.5 parts of product of boiling point 138–142° at 540 mm. mercury was collected over a period of 2 hours. This was found to consist almost entirely of tetraethylsilane with traces of triethylmethylsilane and triethylsilane.

Example 24

16 parts of the dried residue used in Example 9 and 9 parts of a ground aluminium alloy containing 75% aluminium and 25% magnesium were mixed together, heated to 280° C. and nitrogen passed through the mixture for 30 min. Methyl chloride was thereafter passed through the mixture at the rate of 2.3 parts per hour for 20 hours, and 0.5 part of anhydrous aluminium chloride were introduced shortly after the start of the methyl chloride flow. A product was obtained consisting of a methyl chloride solution containing 2 parts of tetramethylsilane.

Example 25

A process similar to that of Example 24 was carried out in which the aluminium alloy was replaced by 9 parts of an alloy containing 80% aluminium and 20% silicon. A product was obtained consisting of a methyl chloride solution containing 6.23 parts of tetramethylsilane, 0.15 part trimethylchlorsilane, 0.15 part dimethyldichlorsilane and 2 parts methyltrichlorsilane.

Example 26

A process similar to that of Example 24 was followed except that the aluminium alloy was replaced by 9 parts of an alloy containing 94% aluminium and 6% chromium. There was obtained a methyl chloride solution containing 3.8 parts tetramethylsilane, 0.08 part dimethyldichlorsilane, 0.15 part methyltrichlorsilane and a trace of trimethylchlorsilane.

Example 27

A process similar to that of Example 24 was followed except that the aluminium alloy was replaced by 9 parts of an alloy containing 90% aluminium and 10% manganese. A methyl chloride solution containing 5.4 parts of tetramethylsilane was obtained.

Example 28

A process similar to that of Example 24 was followed except that the aluminium alloy was replaced by 9 parts of an alloy containing 95% aluminium and 5% iron. A methyl chloride solution was obtained containing 3.6 parts tetramethylsilane, 0.12 part trimethylchlorsilane and 0.24 part dimethyldichlorsilane.

Example 29

A process similar to that of Example 24 was followed except that the aluminium alloy was replaced by 15 parts of an alloy containing 50% aluminium and 50% copper. A methyl chloride solution containing 3.2 parts of tetramethylsilane and 0.03 part of trimethylchlorsilane was obtained.

Example 30

A process similar to that of Example 24 was followed except that the aluminium alloy was replaced by 15 parts of an alloy containing 50% aluminium and 50% zinc. A methyl chloride solution was obtained containing 3.1 parts of tetramethylsilane, 0.06 part trimethylchlorsilane and 0.02 part of dimethyldichlorsilane.

Example 31

17.6 parts methyl aluminium sesquichloride were heated with 3 parts of dried chromatographic silica gel of size 50–250 microns at 300–305° C. for 6 hours. The reaction mixture was cooled to 0° C. the pressure released and the mixture distilled at 0° C. to give 3.85 parts of a colourless distillate consisting of 99% tetramethylsilane and 1% of trimethylchlorsilane.

Example 32

The process of Example 31 was carried out except that 4 parts of the silica gel were used. 4.52 parts of distillate consisting of 82% tetramethylsilane and 18% trimethylchlorsilane were obtained.

Example 33

The process of Example 31 was carried out except that 5 parts of the silica gel were used. 6.82 parts of distillate consisting of 16% tetramethylsilane and 84% trimethylchlorsilane were obtained.

Example 34

The process of Example 31 was repeated except that 6 parts of the silica gel were used. 7.72 parts of distillate consisting of 3% tetramethylsilane, 93% trimethylchlorsilane and 4% dimethyldichlorsilane were obtained.

Example 35

The process of Example 31 was repeated except that 9 parts of the silica gel were used. 7.86 parts of distillate consisting of 2% tetramethylsilane, 72% trimethylchlorsilane and 26% dimethyldichlorsilane were obtained.

Example 36

11.5 parts of dimethyl aluminium chloride and 7 parts of dried chromatographic silica gel were reacted in the manner described in Example 31. 4.7 parts of distillate containing 52% tetramethylsilane and 46% trimethylchlorsilane were obtained.

Example 37

28.1 parts of methyl aluminium dichloride and 7 parts of dried chromatographic silica gel were reacted as in Example 31. 4.9 parts of distillate consisting of 59% trimethylchlorsilane, 34% dimethyldichlorsilane and 6% methyltrichlorsilane were obtained.

Example 38

14 parts of dimethyl aluminium fluoride and 7 parts of dried chromatographic silica gel were reacted together in a manner similar to that of Example 31 for a period of 12 hours. 3.39 parts of distillate containing 99% tetramethylsilane were obtained.

Example 39

73 parts of methyl aluminium sesquibromide and 9.7 parts of dried chromatographic silica gel were reacted by heating in a reaction vessel fitted with an air cooled condenser and tube leading to a trap cooled to 0° C. After 12 hours 12 parts of a distillate containing 88% tetramethylsilane and 12% methyl bromide were obtained. 15.5 parts of aluminium trimethyl and 9.7 parts of dried chromatographic silica gel were added to the residue and heating thereafter continued for a further 14 hours to yield 7.9 parts of a distillate containing 85% tetramethylsilane and 15% methyl bromide.

Example 40

2430 parts of ethyl aluminium sesquibromide and 353 parts of dried chromatographic silica gel were heated together under reflux. When the temperature of the refluxing liquid had fallen to 150° C. this liquid was collected intermittently and gave 432 parts of a liquid of boiling point 148–152° C. and consisting of 98% tetramethylsilane, 2% triethylmethylsilane and a trace of triethylsilane.

Example 41

A reaction vessel was charged with 160 parts of the dried residue used in Example 9 and 90 parts of ground scrap aluminium containing 1.4% magnesium and 91% aluminium. The mixture was heated at 245° C. and nitrogen passed through it for 30 minutes. Methyl chloride was thereafter passed through the mixture at the rate of 42 parts per hour for 10 hours and 0.5 part of anhydrous aluminium chloride introduced at the commencement of the addition of methyl chloride. A methyl chloride solution containing 55.4 parts of organo-silicon compounds consisting of 85% tetramethylsilane, and 20% trimethylchlorsilane was obtained.

Example 42

A reaction vessel was charged, as in Example 41. The mixture was heated at 270° C. and nitrogen passed through for 30 minutes. Methyl chloride was thereafter passed through the mixture at the rate of 31 parts per hour for 10 hours and 0.5 part of anhydrous aluminium chloride introduced at the commencement of the addition of methyl chloride. Methyl chloride solution containing 49 parts of organo-silicon compounds consisting of 84% tetramethylsilane, 14% trimethylchlorsilane and 2% dimethyldichlorsilane.

What I claim is:

1. A process for the production of alkyl and alkyl halosilanes comprising reacting together silica and an alkyl aluminium halide of the general formula $$R_a R'_b Al X_{3-a-b}$$

where R and R' are alkyl groups, X is a halogen, $a$ is an integer of from 1 to 2, $b$ is an integer of from 0 to 1 and $a+b$ is an integer of from 1 to 2.

2. A process according to claim 1 wherein the silica is a silica gel.
3. A process according to claim 1 wherein the silica is a fume silica.
4. A process according to claim 1 wherein the silica is a diatomaceous earth.
5. A process according to claim 1 wherein the silica is an industrial residue obtained by extrusion of metal oxides from a silicate.
6. A process according to claim 1 wherein the silica is of high specific surface area.
7. A process according to claim 1 wherein the silica is in a non-crystalline form.
8. A process according to claim 1 wherein the silica is dried by heating prior to use.
9. A process according to claim 1 wherein the alkyl aluminium halide is a compound selected from the group consisting of methyl and ethyl aluminium halide.
10. A process according to claim 1 wherein the reaction mixture contains at least one aluminium trialkyl.
11. A process according to claim 1 wherein the reaction mixture also contains at least one aluminium halide.
12. A process according to claim 1 wherein the alkyl aluminium halide is formed in situ by the reaction of an alkyl halide and aluminium.
13. A process according to claim 12 wherein a small proportion of an initiating catalyst is added to the reaction mixture.
14. A process according to claim 1 wherein the molar proportion of silicon to aluminium is from 1 to 2 to 4 to 1.
15. A process according to claim 14 wherein the ratio is from 1 to 1 to 2 to 1.
16. A process according to claim 1 wherein the reactants are heated together under pressure.
17. A process according to claim 16 wherein the pressure is the autogenous pressure generated at the temperature of reaction.
18. A process according to claim 1 in which the reaction is carried out under atmospheric pressure.
19. A process according to claim 1 in which the reaction is carried out at sub-atmospheric pressures.
20. A process according to claim 1 wherein the reaction is carried out at a temperature within the range 125 to 500° C.
21. A process according to claim 20 wherein the temperature range is from 200 to 330° C.

References Cited in the file of this patent

UNITED STATES PATENTS

| 2,762,824 | Brown | Sept. 11, 1956 |

FOREIGN PATENTS

| 888,852 | Germany | Sept. 7, 1953 |
| K18,391 | Germany | Feb. 2, 1956 |

OTHER REFERENCES

Kautsky et al.: "Zeitschrift fur Naturforschung," vol. 10b (1955) pp. 422–3 (Chem. Abstracts vol. 50, p. 9283).